(12) United States Patent
Clark et al.

(10) Patent No.: US 7,890,704 B2
(45) Date of Patent: Feb. 15, 2011

(54) IMPLEMENTING AN ENHANCED HOVER STATE WITH ACTIVE PREFETCHES

(75) Inventors: Leo J. Clark, Georgetown, TX (US); James S. Fields, Jr., Austin, TX (US); Pak-Kin Mak, Poughkeepsie, NY (US); William J. Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 11/612,568

(22) Filed: Dec. 19, 2006

(65) Prior Publication Data

US 2008/0147991 A1 Jun. 19, 2008

(51) Int. Cl.
*G06F 12/08* (2006.01)

(52) U.S. Cl. .................. 711/141; 711/124; 711/137; 711/144; 711/146

(58) Field of Classification Search .................. None
See application file for complete search history.

(56) References Cited

U.S. PATENT DOCUMENTS

| | | | |
|---|---|---|---|
| 5,615,334 A * | 3/1997 | Wang et al. | ........... 714/48 |
| 5,852,716 A | 12/1998 | Hagersten | |
| 6,021,466 A * | 2/2000 | Olarig | ........... 711/122 |
| 6,292,872 B1 * | 9/2001 | Arimilli et al. | ........... 711/146 |
| 6,415,358 B1 | 7/2002 | Arimilli et al. | |
| 6,606,676 B1 | 8/2003 | Deshpande et al. | |
| 7,076,613 B2 * | 7/2006 | Peir et al. | ........... 711/141 |
| 7,096,323 B1 | 8/2006 | Conway et al. | |
| 7,162,590 B2 | 1/2007 | Pruvost et al. | |
| 7,318,074 B2 * | 1/2008 | Iyengar et al. | ........... 707/203 |
| 7,444,494 B2 | 10/2008 | Goodman et al. | |
| 2003/0009637 A1 | 1/2003 | Arimilli et al. | |
| 2003/0097529 A1 | 5/2003 | Arimilli et al. | |
| 2003/0154350 A1 | 8/2003 | Edirisooriya et al. | |
| 2005/0044174 A1 | 2/2005 | Landin et al. | |
| 2006/0224833 A1 | 10/2006 | Guthrie et al. | |

OTHER PUBLICATIONS

Patterson and Hennessy; "Computer Architecture—A Quantitative Approach"; 1996; Morgan Kaufmann Publishers; 2nd edition, p. 75.

* cited by examiner

*Primary Examiner*—Gary J Portka
(74) *Attorney, Agent, or Firm*—Dillon & Yudell LLP (57) ABSTRACT

A system and method for implementing an enhanced hover state with active prefetches. According to a preferred embodiment of the present invention, a snooper in a processing unit receives a system-wide update complete operation indicating a completion of a storage-modifying operation targeting a particular address, where the storage-modifying operation results in a modified first cache line in a first cache memory. The snooper determines if a second cache memory held a second cache line associated with the particular address prior to receiving the system-wide update complete operation. If so, the snooper issues a prefetch request for a copy of the modified first cache line to replace the second cache line in the second cache memory. The snooper updates the second cache memory with a copy of the modified first cache line.

14 Claims, 6 Drawing Sheets

IMPLEMENTING AN ENHANCED HOVER STATE WITH ACTIVE PREFETCHES

CROSS REFERENCE TO RELATED APPLICATION(S)

The present application is related to U.S. patent application Ser. No. 11/140,821 which is assigned to the assignee of the present invention and incorporated herein by reference in its entirety.

BACKGROUND OF THE INVENTION

1. Technical Field

The present invention relates in general to the field of data processing systems. More particularly, the present invention relates to a cache coherency protocol for a data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of cache states stored in association with the cache lines of each cache hierarchy, as well as a set of coherency messages utilized to communicate the cache state information between cache hierarchies. In a typical implementation, the cache state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request.

In a multiprocessor computer system, processing units often update cache lines stored in their local caches. Currently, once a first processing unit updates a cache line in the local cache. Other processing units with a copy of the cache line will mark their copy of the cache line as a cache line that needs to be updated. Some protocols have been proposed and implemented where a cache controller watches system data transactions and grab an updated copy of the cache line if the cache line happens to pass by the cache controller on the interconnect.

In today's hierarchical system structures, there is no guarantee that the cache line will become visible to all interested caches in time to avoid latency penalties. Other protocols involve a system-wide broadcast of the cache line after an update so that any caches that require a new copy of the cache line are guaranteed to see the updated cache line. However, these protocols are inefficient because the system-wide broadcasts of the updated cache line consume unnecessary bandwidth on the interconnect.

Therefore, because of the aforementioned limitations of the prior art, there is a need for a system and method of efficiently providing updated cache lines to caches that require a cache line update without consuming unnecessary bandwidth within a data processing system.

SUMMARY OF THE INVENTION

The present invention includes a system and method for implementing an enhanced hover state with active prefetches. According to a preferred embodiment of the present invention, a snooper in a processing unit receives a system-wide update complete operation indicating a completion of a storage-modifying operation targeting a particular address, where the storage-modifying operation results in a modified first cache line in a first cache memory. The snooper determines if a second cache memory held a second cache line associated with the particular address prior to receiving the system-wide update complete operation. If so, the snooper issues a prefetch request for a copy of the modified first cache line to replace the second cache line in the second cache memory. The snooper updates the second cache memory with a copy of the modified first cache line.

The snooper determines if the second cache memory held the second cache line associated with the particular address prior to receiving the system-wide update complete operation by accessing a cache directory associated with the second cache memory to determine if the second cache line is in a hover coherency state.

If the snooper determines that the copy of the modified first cache line has not been received, the snooper resends the prefetch request and increments a counter to determine the number of prefetch request retries sent.

All objects, features, and advantages of the present invention will become apparent in the following detailed written description.

BRIEF DESCRIPTION OF THE FIGURES

The novel features believed characteristic of the invention are set forth in the appended claims. However, the invention, as well as a preferred mode of use, will best be understood by reference to the following detailed description of an illustrative embodiment when read in conjunction with the accompanying figures, wherein:

FIG. 5B is a high-level logical flowchart of a method by which cache memory processes and "update complete"

operation snooped on the system interconnect according to an embodiment of the present invention.

DETAILED DESCRIPTION OF ILLUSTRATIVE EMBODIMENT

Figure 1:
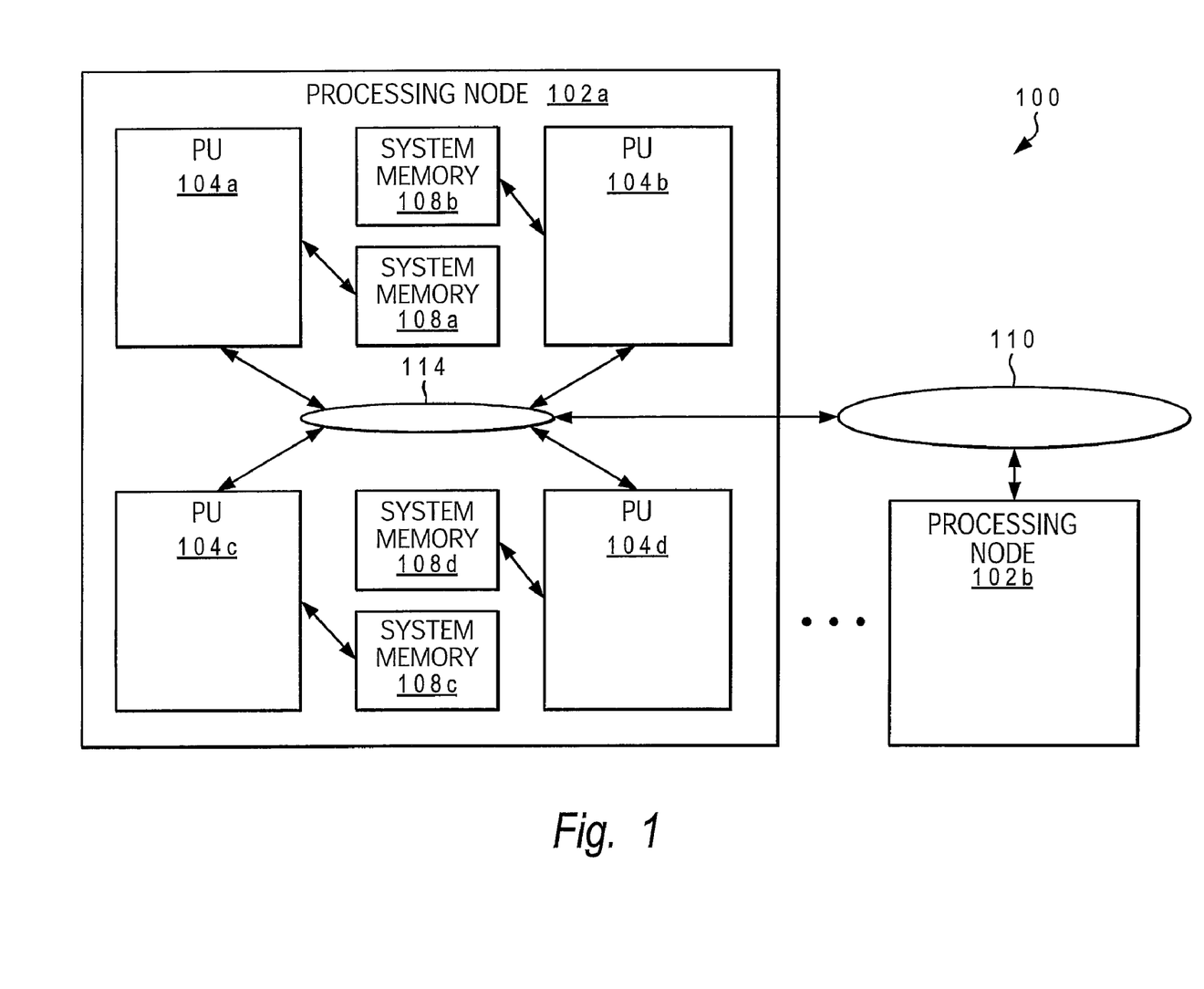
FIG. 1 is a high level block diagram of an exemplary data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 108a-108d. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
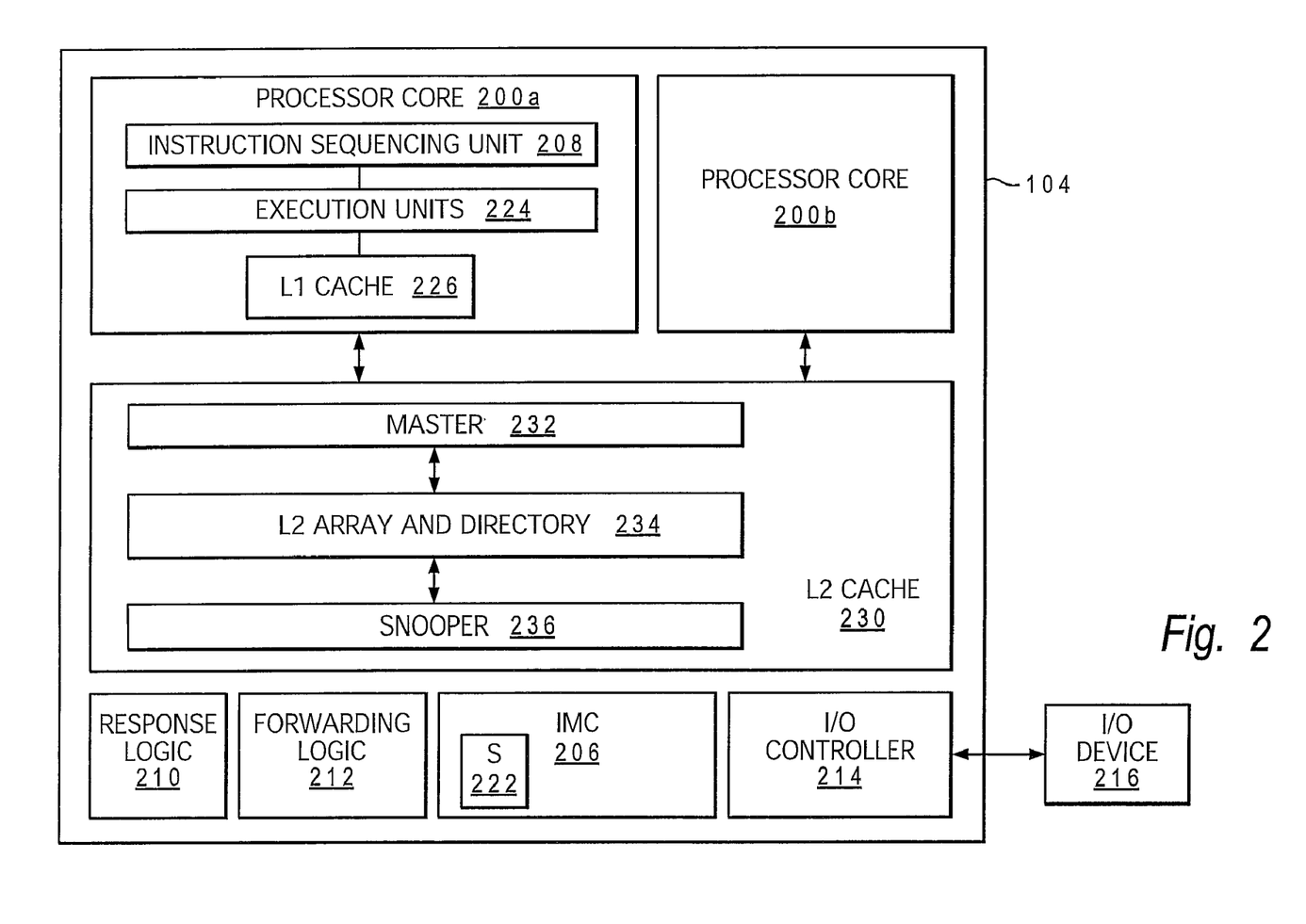
FIG. 2 is a more detailed block diagram of a processing unit in accordance with the present invention.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 208 for fetching and ordering instructions for execution and one or more execution units 224 for executing instructions. The instructions executed by execution units 224 include instructions that request access to a memory block or cause the generation of a request for access to a memory block.

The operation of each processor core 200 is supported by a multi-level volatile memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 102 in response to requests received from processor cores 200a-200b and operations snooped by a snooper (S) 236 on the local interconnect 114.

In the illustrative embodiment, the cache memory hierarchy of processing unit 104 includes a store-through level one (L1) cache 226 within each processor core 200 and a level two (L2) cache 230 shared by all processor cores 200a, 200b of the processing unit 104. L2 cache 230 includes an L2 array and directory 234, a master 232 and a snooper 236. Master 232 initiates transactions on local interconnect 114 and system interconnect 110 and accesses L2 array and directory 234 in response to memory access (and other) requests received from the associated processor cores 200a-200b. Snooper 236 snoops operations on local interconnect 114, provides appropriate responses, and performs any accesses to L2 array and directory 234 required by the operations.

Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

Each processing unit 104 further includes an instance of response logic 210, which implements a portion of the distributed coherency signaling mechanism that maintains cache coherency within data processing system 100. In addition, each processing unit 104 includes an instance of forwarding logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. As described further below, I/O controller 214 may issue operations on local interconnect 114 and/or system interconnect 110 in response to requests by I/O device 216.

Figure 3:
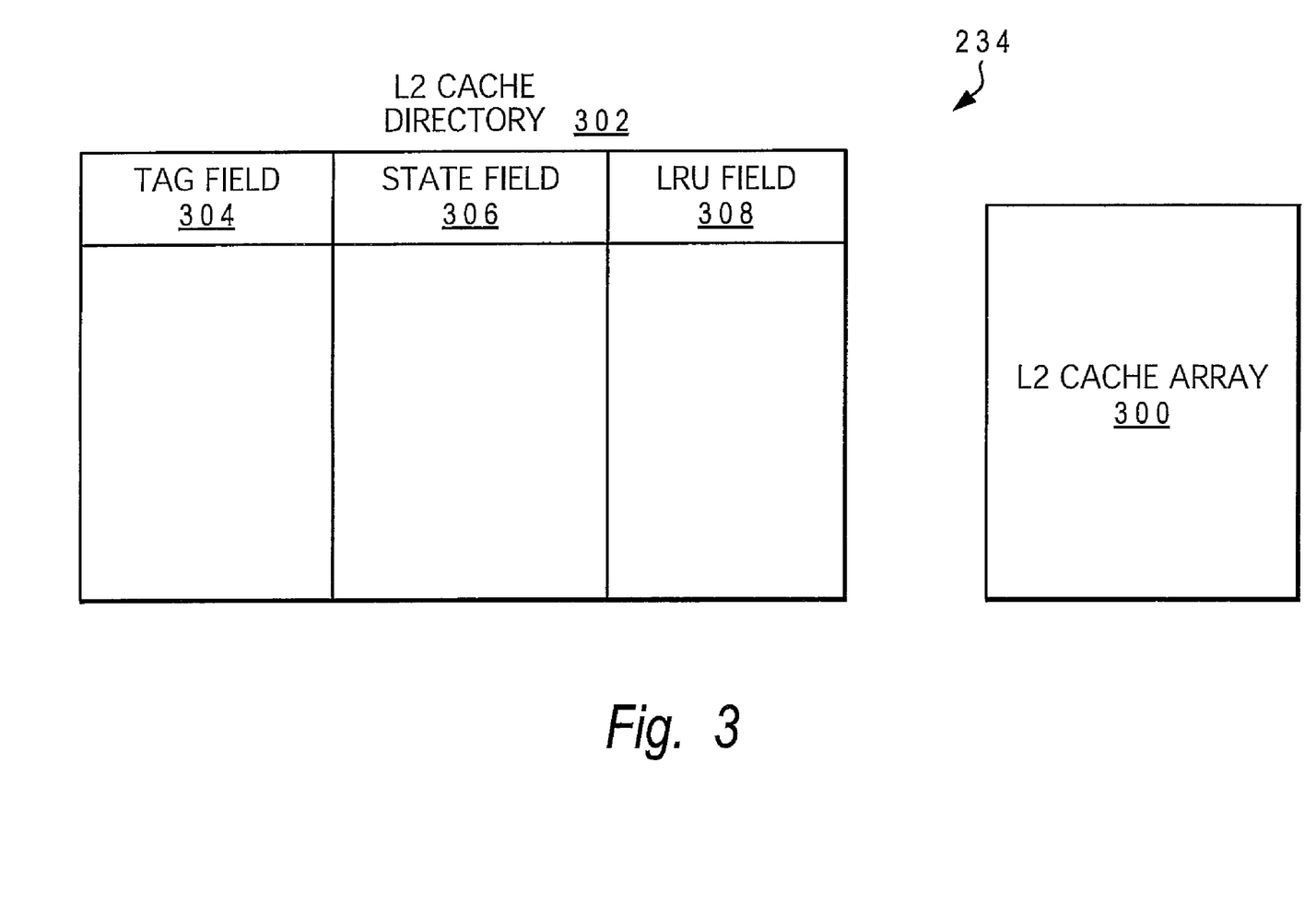
FIG. 3 is a more detailed block diagram of the L2 cache array and directory depicted in FIG. 2.

With reference now to FIG. 3, there is illustrated a more detailed block diagram of an exemplary embodiment of L2 array and directory 234. As illustrated, L2 array and directory 234 includes a set associative L2 cache array 300 and an L2 cache directory 302 of the contents of L2 cache array 300. As in conventional set associative caches, memory locations in system memories 108 are mapped to particular congruence classes within cache arrays 300 utilizing predetermined index bits within the system memory (real) addresses. The particular cache lines stored within cache array 300 are recorded in cache directory 302, which contains one directory entry for each cache line in cache array 300. As understood by those skilled in the art, each directory entry in cache directory 302 comprises at least a tag field 304, which specifies the particular cache line stored in cache array 300 utilizing a tag portion of the corresponding real address, a state field 306, which indicates the coherency state of the cache line, and a LRU (Least Recently Used) field 308 indicating a replacement order for the cache line with respect to other cache lines in the same congruence class.

The present invention preferably implements a cache coherency protocol that manages conflicts between multiple copies of cache lines stored in multiple caches and maintains consistency of data between the caches and system memory. As well-known in the art, systems utilizing a MESI protocol mark each cache line with one of the four following coherency states:

M (Modified): The cache line tag and data are valid and present only in the current cache and are considered "dirty", or modified from the value of the cache line stored in main memory.

E (Exclusive): The cache line tag and data are valid and present only in the current cache and are "clean", or identical to the value of the corresponding line stored in main memory.

S (Shared): The cache line tag and data are valid and may be stored in one ore more other caches of the system.

I (Invalid): The cache line tag and data are invalid.

A cache may enable a read to a cache line in any state except "Invalid". A cache line in an "Invalid" state must be fetched from another cache or main memory to satisfy the read. A write may be performed if the cache line is in a "Modified" or "Exclusive" state. In the prior art, if the cache line is in the Shared state, all other cached copies must first be invalidated, which is typically performed via a broadcast operation.

In some modified MESI coherency protocols, there may be more than one type of "M", "S", and "I" states. For example, an "$M_e$" state indicates that the cache line is modified, with respect to memory and exclusively held in the present cache. Other modified MESI protocols include a "Tagged" or "T" state, which indicates that the cache line is modified with respect to memory, but is also shared by other caches.

The present invention utilizes a variant of the MESI protocol that includes a "Hover" (H) state indicating that the address tag for the cache line is valid and the cache line data is invalid. If a cache line is marked with an "H" state, the cache holding the cache line in the "H" state will try to reacquire an updated copy of the cache line data. For example, assume that a data processing system includes three processors (e.g., processor 0, 1, and 2) with associated caches (e.g., cache 0, 1, and 2) that each hold a copy of a cache line in the "S" state. If processor 0 modifies the local copy of the cache line stored in cache 0, the copy of the cache line stored in cache 0 is marked as "M". The copies of the cache line stored in the caches 1 and 2 will be marked as "H". According to the present invention, once processor 0 has completed the modification to the copy of the cache line stored in cache 0 and has notified processors 1 and 2 of the modification (e.g., via an "update complete" system-wide, address-only broadcast), processors 1 and 2 will issue data prefetch requests to reacquire the cache line. Once the prefetch requests are satisfied, the cache line stored in caches 1 and 2 will return to a shared (e.g., "S') state. Of course, those with skill in the art will appreciate that the present invention must send the address of the updated cache line to notify all other caches that may have a prior copy of the updated cache line as part of a validity protocol. The actual data that comprises the updated cache line is not broadcast to all caches in the data processing system to conserve bandwidth over the system interconnect. Only caches that stored a prior copy of the updated cache line will prefetch an updated copy of the cache line in response to receiving the "update complete" system wide, address-only broadcast.

Figure 4:
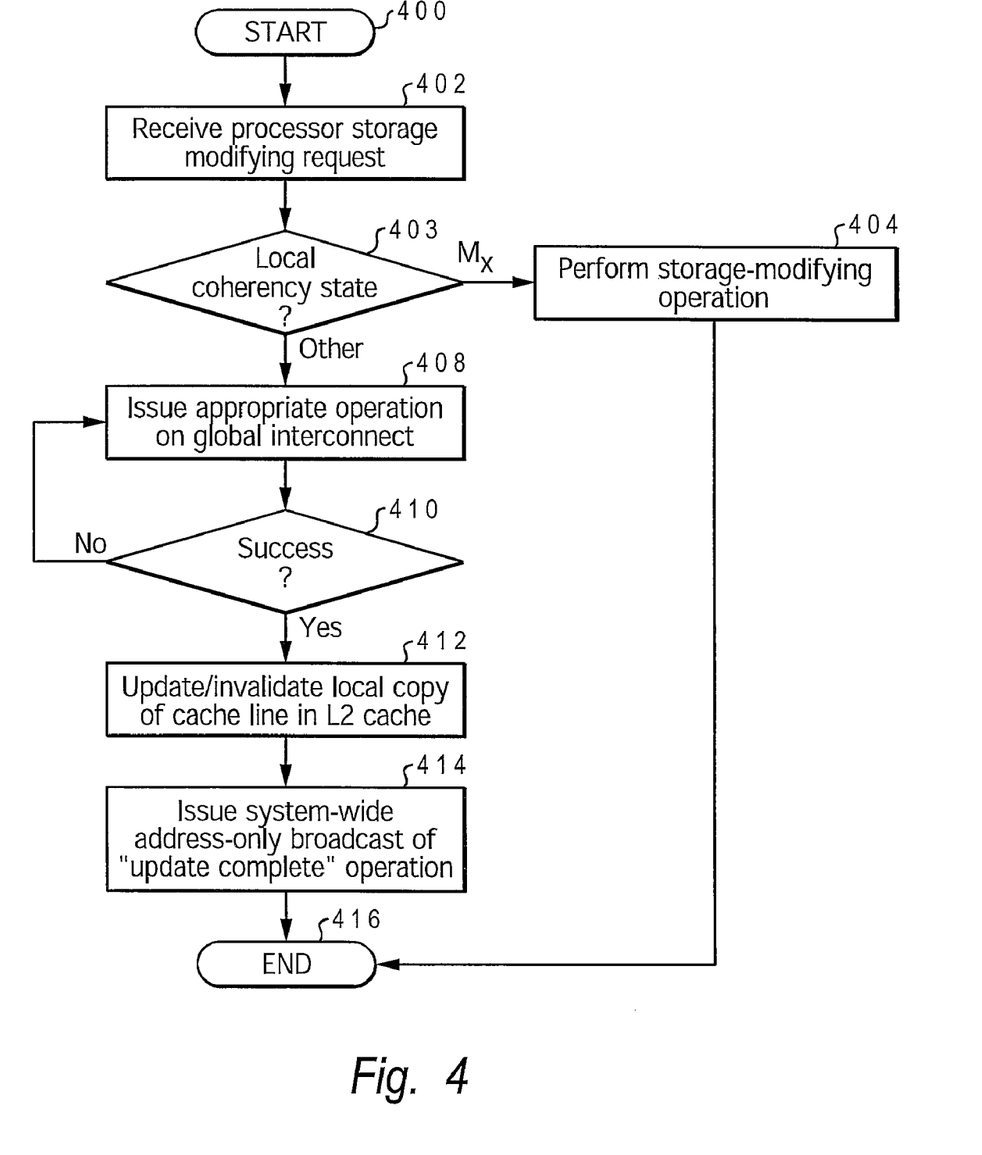
FIG. 4 is a high-level logical flowchart of an exemplary method by which cache memory services a request received from its associated processor core according to an embodiment of the present invention.

FIG. 4 is a high-level logical flowchart of an exemplary method by which cache memory services a storage-modifying request received from its associated processing unit according to an embodiment of the present invention. The process begins at step 400 and proceeds to step 402, which illustrates master 232 of L2 cache 230 receiving a storage-modifying operation request such as a store request or invalidation request from either of its associated processor cores 200a-200b. The process continues to step 403, which depicts master 232 determining the local coherency state of the particular cache line that is the target of the storage-modifying request. If the coherency state in state field 306 (FIG. 3) of the cache line in L2 array 300 is in a "Modified" or "M" state, the process continues to step 404, which shows master 232 performing the storage-modifying operation on the cache line. The process ends thereafter at step 416.

Returning to step 403, if the coherency state in state field 306 of the cache line in L2 array 300 is in a coherency state in which master 232 cannot service the processor requests without initiating on operation on system interconnect 110. (e.g., "Shared" or "Invalid"), the process continues to step 408, which depicts master 232 issuing an appropriate storage-modifying operation on system interconnect 110. The process continues to step 410, which shows master 232 determining if the storage-modifying operation was a success, for example, by reference to a system-wide combined response. If the operation is not a success, the process returns to step 408.

If the operation was a success, the process proceeds to step 412, which illustrates master 232 invalidating or updating its local copy of the target cache line in L2 array 300. After the cache line is invalidated or updated, the process continues to step 414, which depicts master 232 broadcasting a system-wide, address-only "update complete" operation in order to indicate that the storage-modifying operation is complete and the cache line is available to be prefetched by any other processing unit within data processing system 100 that held a valid copy of the cache line in its L2 cache 230 immediate prior to the receipt of the storage-modifying operation. The process then ends at step 416.

Figure 5A:
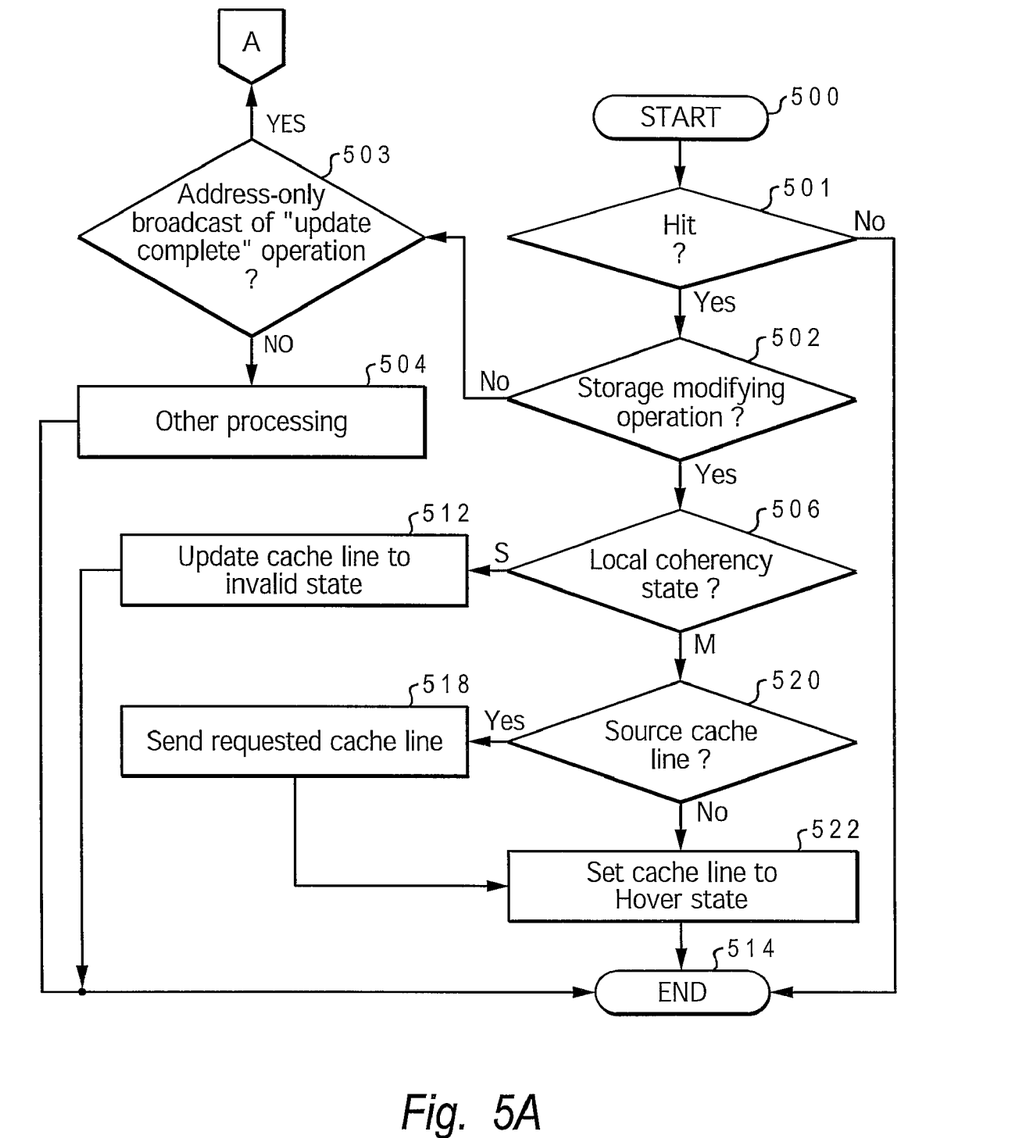
FIG. 5A is a high-level logical flowchart of an exemplary method by which cache memory processes a storage-modifying operation snooped on the system interconnect according to an embodiment of the present invention.

FIG. 5A is a high-level logical flowchart illustrating an exemplary method by which a cache memory processes storage-modifying operations snooped on a system interconnect according to an embodiment of the present invention. The process begins at step 500, in response to receipt by a snooper 236 of an operation snooped on system interconnect 110. The process then proceeds to step 501, which depicts snooper 236 determining if the operation snooped on system interconnect 110 targets a valid cache line stored in associated L2 array 300 (e.g., cache hit). If the operation does not target a cache line stored in L2 array 300, the process ends at step 514.

If the operation targets a valid cache line stored in L2 array 300 (e.g., cache hit), the process continues to step 502, which illustrates snooper 236 determining if the operation is a storage-modifying operation (e.g., a store request or invalidation request). If snooper 236 determines that the operation is not a storage-modifying operation, the process proceeds to step 503, which illustrates snooper 236 determining if the snooped operation is a system-wide, address-only broadcast of an "update complete" operation. If the snooped operation is a system-wide, address-only broadcast of an "update complete" operation, the process passes through page connector "A" to FIG. 5B, which is discussed below. If the snooped operation is not a system-wide, address-only broadcast of an "update complete" operation, the process proceeds to step 504, which depicts snooper 236 performing other processing for the snooped operation. The process then ends at step 514.

Returning to step 502, if snooper 502 determines that the snooped operation is a storage-modifying operation, the process continues to optional step 506, which shows snooper 236 determining the local coherency state of the cache line. Step 506 is an optional step because it may not be desirable for each snooped storage-modifying operation to automatically result in a data prefetch request. The prefetch requests consume needed system interconnect bandwidth and may therefore be limited to cache lines with particular coherency states. For example, a cache line with a local coherency state of "M" may be more likely accessed in the near future, since the processing unit associated with the local cache has recently modified the cache line. A cache line that has a local coherency state of "S" may be less likely to be accessed again.

If the local coherency state of the local copy of the cache line is "Shared", the process continues to step 512, which shows snooper 236 updating the coherency state of the cache line to "Invalid". The process then ends at step 514.

Returning to step 506, if the local coherency state is "Modified", the process continues to step 520, which depicts snooper 236 determining if snooper 236 is required to source the cache line to a requesting processor that issued the snooped operation. If snooper 236 is required to source the cache line to the requesting processor, the process continues to step 518, which illustrates snooper 236 sending the cache line to the requesting processor by cache-to-cache intervention. The process then continues to step 522, which shows snooper 236 updating the coherency state of the cache line to "Hover". If, however, snooper 236 is not required to source the cache line to the requesting processing unit, the process proceeds directly to step 522. The process then ends at step 514. Those with skill in the art will appreciate that step 506 is an optional step because the present invention includes snooper 236 updating the coherency state of the cache line to "Hover" regardless of the prior coherency state of the cache line (e.g., "M", "S", "I", etc.).

Figure 5B:
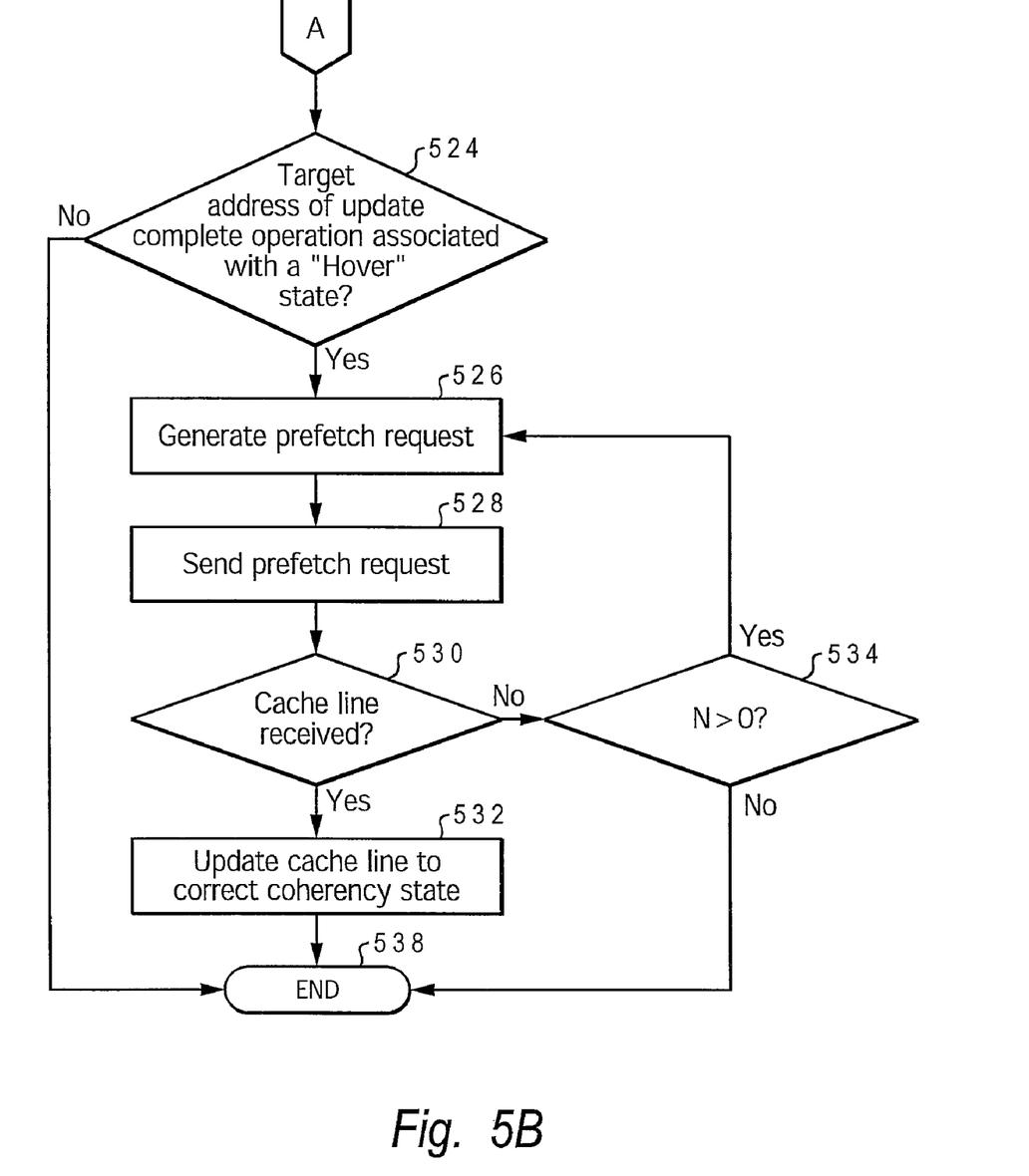

FIG. 5B is a high-level logical flowchart of an exemplary method by which cache memory processes an "update complete" operation snooped on the system interconnect according to an embodiment of the present invention. The process begins at page connector "A", in response to a determination at step 503 of FIG. 5A that a operation snooped by snooper 236 is an address-only, system-wide broadcast of an "update complete" operation. The "update complete" operation indicates that a cache line that was the target of a storage-modifying operation.

The process continues to step 524, wherein if the associated cache directory 302 associates the target address of the "update complete" operation with the "Hover" state, the process continues to steps 526 and 528, which depict snooper 236 generating and sending a data prefetch request to retrieve a newly-updated copy of the cache line utilizing the received address from the "update complete" operation, as shown in step 526. Prefetching a newly-updated copy of the cache line reduces the chance of a pipeline stall within processing units 104a-104n.

The fact that a cache line is stored in a L2 cache directory 302 indicates that the associated processing unit has recently referenced the cache line and will likely reference the cache line again. Since the processing unit will probably reference the cache line in the near future, prefetching a newly-updated copy of the cache line in anticipation of the future reference will reduce the chance of a pipeline stall because the processing unit will be less likely to have to wait for a fetch of the newly-updated cache line (thus stalling the pipeline) when the processing unit requires the cache line for processing.

After step 528, the process continues to step 530, which illustrates snooper 236 determining if the requested newly-updated cache line has been received in response to the prefetch request discussed in step 528. In one embodiment of the present invention, snooper 236 retries the prefetch request, if necessary, up to N times, as indicated by step 534.

Returning to step 530, if the requested newly-updated cache line is received, snooper 236 updates the cache line to the correct coherency state (e.g., "Shared"). The process then ends at step 538.

As discussed, the present invention includes a system and method for implementing an enhanced hover state with active prefetches. According to a preferred embodiment of the present invention, a snooper in a processing unit receives a system-wide update complete operation indicating a completion of a storage-modifying operation targeting a particular address, where the storage-modifying operation results in a modified first cache line in a first cache memory. The snooper determines if a second cache memory held a second cache line associated with the particular address prior to receiving the system-wide update complete operation. If so, the snooper issues a prefetch request for a copy of the modified first cache line to replace the second cache line in the second cache memory. The snooper updates the second cache memory with a copy of the modified first cache line.

The snooper determines if the second cache memory held the second cache line associated with the particular address prior to receiving the system-wide update complete operation by accessing a cache directory associated with the second cache memory to determine if the second cache line is in a hover coherency state.

Those with skill in the art will appreciate that whether or not a prefetch request is generated in response to the completion of a storage-modifying operation may depend on the type of operation or transaction type detected on the system interconnect.

While the present invention has been particularly shown and described with reference to a preferred embodiment, it will be understood by those skilled in the art that various changes in form and detail may be made therein without departing from the spirit and scope of the invention.

What is claimed is:

1. A method for implementing a cache coherency protocol for a data processing system having multiple processing units communicating over an address and data interconnect, said method comprising:

the multiple processing units receiving a system-wide update complete signal over said interconnect indicating a completion of a storage-modifying operation targeting a particular address, where said storage-modifying operation results in a modified first cache line in a first cache memory in a first processing unit among said multiple processing units;

determining if a second cache memory in a second processing unit among said multiple processing units held a second cache line associated with said particular address prior to receiving said system-wide update complete signal;

wherein said determining further includes accessing a cache directory associated with said second cache memory to determine if said second cache line is in a hover coherency (H) state, wherein the H state indicates that the address tag for the second cache line is valid, and the cache line data in the second cache line is now invalid;

wherein when a cache line is marked with an H state, the cache holding the cache line in the H state attempts to reacquire an updated copy of the cache line data from another cache line of another cache which holds the cache line in a modified (M) state;

in response to determining said second cache memory held a second cache line associated with said particular address prior to receiving said system-wide update complete operation, issuing a prefetch request for a copy of said modified first cache line to replace said second cache line in said second cache memory before data associated with the particular address of said second cache line is requested by the processing unit associated with the second cache memory; and in response to the prefetch request returning the copy of the modified first cache line, updating said second cache line within said second cache memory with said copy of said modified first cache line.

2. The method according to claim 1, further comprising:
determining a local coherency state of said second cache line;
in response to determining said local coherency state of said second cache line is shared, updating said local coherency state of said second cache line to invalid.

3. A method for implementing a cache coherency protocol for a data processing system having multiple processing units communicating over an address and data interconnect, said method comprising:
the multiple processing units receiving a system-wide update complete signal over said interconnect indicating a completion of a storage-modifying operation targeting a particular address, where said storage-modifying operation results in a modified first cache line in a first cache memory in a first processing unit among said multiple processing units;
determining if a second cache memory in a second processing unit among said multiple processing units held a second cache line associated with said particular address prior to receiving said system-wide update complete signal;
in response to determining said second cache memory held a second cache line associated with said particular address prior to receiving said system-wide update complete operation, issuing a prefetch request for a copy of said modified first cache line to replace said second cache line in said second cache memory;
in response to the prefetch request returning the copy of the modified first cache line, updating said second cache line within said second cache memory with said copy of said modified first cache line;
determining a local coherency state of said second cache line;
in response to determining said local coherency state of said second cache line is modified, determining if said second cache line is required to be sourced;
in response to determining said second cache line is required to be sourced, sending said second cache line to a requesting processing unit and updating said local coherency state of said second cache line to hover; and
in response to determining said second cache line is not required to be sourced, updating said local coherency state of said second cache line to hover.

4. The method according to claim 1, further comprising:
in response to determining said copy of said modified first cache line has not been received, resending said prefetch request.

5. The method according to claim 4, further comprising:
in response to a number of prefetch request retries reaching a predetermined number, stopping generation of prefetch requests and changing the local coherency state of said second cache line as invalid.

6. A processing unit for implementing a cache coherency protocol in a data processing system having multiple processing units communicating over an address and data interconnect, said processing unit comprising:
at least one processor core;
a local cache array, coupled to said at least one processor core, for caching data for access by said at least one processor core;
at least one snooper for:
receiving a system-wide update complete signal indicating a completion of a storage-modifying operation targeting a particular address, where said storage-modifying operation results in a modified first cache line in a first cache array associated with a first processing unit among said multiple processing units;
determining if said local cache array held a second cache line associated with said particular address prior to receiving said system-wide update complete signal;
wherein said snooper accesses said cache directory to determine if said second cache line is in a hover coherency (H) state, wherein the H state indicates that the address tag for the second cache line is valid, and the cache line data in the second cache line is now invalid;
wherein when a cache line is marked with an H state, the cache holding the cache line in the H state attempts to reacquire an updated copy of the cache line data from another cache line of another cache which holds the cache line in a modified (M) state;
in response to determining said local cache array held a second cache line associated with said particular address prior to receiving said system-wide update complete signal, issuing a prefetch request for a copy of said modified first cache line to replace said second cache line in said local cache array before data associated with the particular address of said second cache line is requested by the processing unit associated with the local cache array; and
in response to the prefetch request returning the copy of the modified first cache line, updating said second cache line within said second cache memory with said copy of said modified first cache line.

7. A data processing system, comprising:
a system interconnect;
a system memory coupled to said system interconnect; and
at least one processing unit according to claim 6, wherein said at least one processing unit is coupled to said system interconnect.

8. The processing unit according to claim 6, further comprising:
a cache directory associated with said local cache array for associating a coherency state with cache lines stored in said local cache array.

9. The processing unit according to claim 6, wherein said snooper updates a local coherency state of said second cache line to invalid, in response to determining said local coherency state of said second cache line is shared.

10. The processing unit according to claim 6, wherein said snooper determines if said second cache line is required to be sourced, in response to determining a local coherency state of said second cache line is modified.

11. A processing unit for implementing a cache coherency protocol in a data processing system having multiple processing units communicating over an address and data interconnect, said processing unit comprising:
at least one processor core;
a local cache array, coupled to said at least one processor core, for caching data for access by said at least one processor core;
at least one snooper for:
receiving a system-wide update complete signal indicating a completion of a storage-modifying operation targeting a particular address, where said storage-modifying operation results in a modified first cache line in a first cache array associated with a first processing unit among said multiple processing units;

determining if said local cache array held a second cache line associated with said particular address prior to receiving said system-wide update complete signal;

in response to determining said local cache array held a second cache line associated with said particular address prior to receiving said system-wide update complete signal, issuing a prefetch request for a copy of said modified first cache line to replace said second cache line in said local cache array;

in response to the prefetch request returning the copy of the modified first cache line, updating said second cache line within said second cache memory with said copy of said modified first cache line;

wherein said snooper determines if said second cache line is required to be sourced, in response to determining a local coherency state of said second cache line is modified; and wherein said snooper sends said second cache line to a requesting processing unit and updates said local coherency state of said second cache line to hover, in response to determining said second cache line is required to be sourced.

12. A processing unit for implementing a cache coherency protocol in a data processing system having multiple processing units communicating over an address and data interconnect, said processing unit comprising:

at least one processor core;

a local cache array, coupled to said at least one processor core, for caching data for access by said at least one processor core;

at least one snooper for:

receiving a system-wide update complete signal indicating a completion of a storage-modifying operation targeting a particular address, where said storage-modifying operation results in a modified first cache line in a first cache array associated with a first processing unit among said multiple processing units;

determining if said local cache array held a second cache line associated with said particular address prior to receiving said system-wide update complete signal;

in response to determining said local cache array held a second cache line associated with said particular address prior to receiving said system-wide update complete signal, issuing a prefetch request for a copy of said modified first cache line to replace said second cache line in said local cache array;

in response to the prefetch request returning the copy of the modified first cache line, updating said second cache line within said second cache memory with said copy of said modified first cache line;

wherein said snooper determines if said second cache line is required to be sourced, in response to determining a local coherency state of said second cache line is modified; and wherein said snooper updates said local coherency state of said second cache line to hover, in response to determining said second cache line is not required to be sourced.

13. The processing unit according to claim 6, wherein said snooper resends said prefetch request, in response to determining said copy of said modified first cache line has not been received.

14. The processing unit according to claim 13, wherein said snooper stops generation of prefetch requests, in response to a number of prefetch requests retries reaching a predetermined number.

* * * * *